D. L. VAUGHAN.
CARRIER FOR PNEUMATIC TIRE SHOES.
APPLICATION FILED OCT. 4, 1913.
1,092,463.
Patented Apr. 7, 1914.
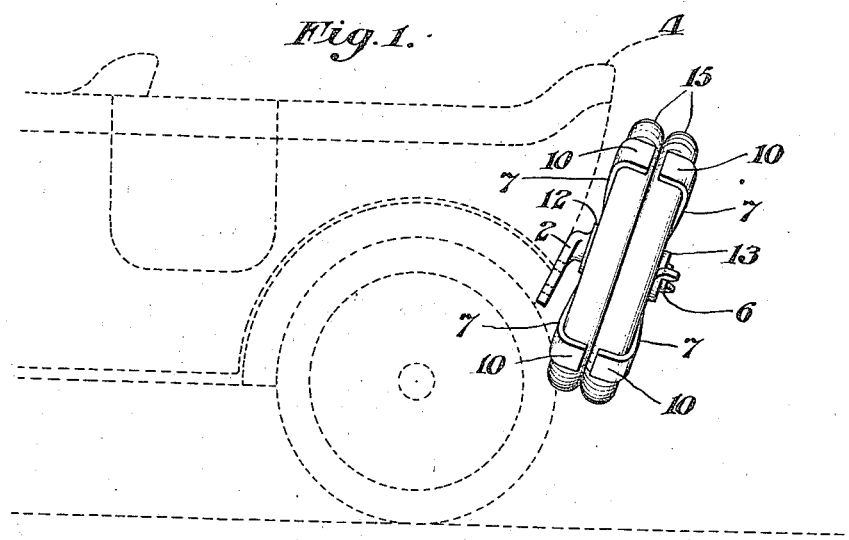
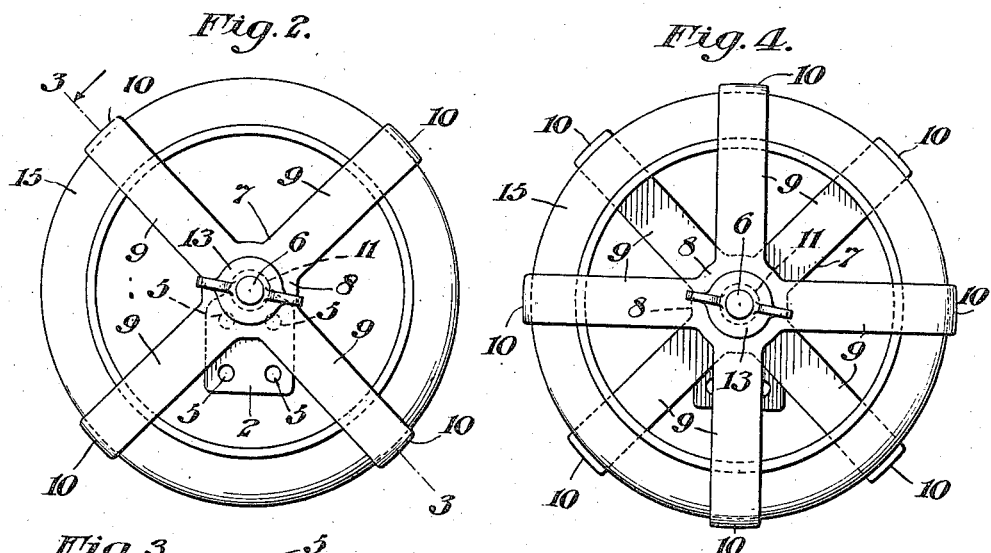
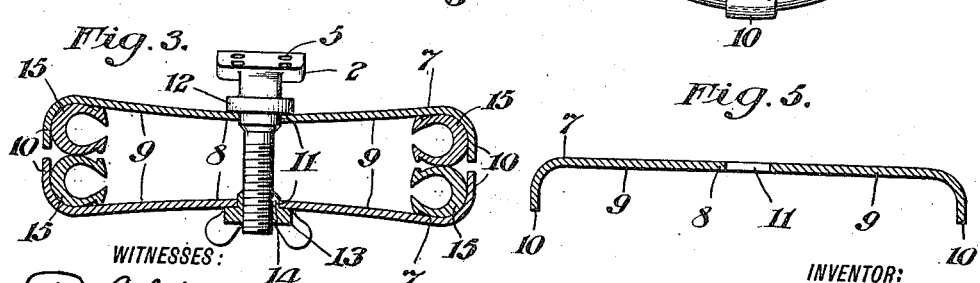
WITNESSES:
R. Schleicher
G. P. Sharkey
INVENTOR:
David L. Vaughan,
BY
ATTORNEY.

UNITED STATES PATENT OFFICE.

DAVID L. VAUGHAN, OF RIVERTON, NEW JERSEY.

CARRIER FOR PNEUMATIC-TIRE SHOES.

1,092,463.   Specification of Letters Patent.   Patented Apr. 7, 1914.

Application filed October 4, 1913.   Serial No. 793,336.

*To all whom it may concern:*

Be it known that I, DAVID L. VAUGHAN, a citizen of the United States, residing at Riverton, in the county of Burlington and State of New Jersey, have invented certain new and useful Improvements in Carriers for Pneumatic-Tire Shoes, of which the following is a specification.

My invention relates to carriers adapted to be applied to automobiles to carry the extra tire shoe or shoes usually carried for repair purposes.

The object of my invention is to provide a carrier of novel, simple and efficient construction which may be readily applied to an automobile and which has provision whereby the tire shoe or shoes may be firmly yet yieldingly held in place, whereby tire shoes may be readily applied to and removed from the carrier, whereby the clamping members for the shoe or shoes may be interchangeable and whereby various advantages are attained.

To this end, the invention consists in the novel features of construction and combinations of parts hereinafter fully described and particularly claimed.

In the accompanying drawings, illustrating my invention, Figure 1, is a side view of my improved carrier applied to an automobile, and carrying two tire shoes, the automobile being shown, in part, by dotted lines. Fig. 2, is a rear view of the carrier with the tire shoes therein. Fig. 3, is a section, on line 3—3 of Fig. 2. Fig. 4, is a view showing a different position of the clamping members relatively to each other. Fig. 5 is a view in section, showing one of the clamp members in normal condition.

Referring to the drawings, 2 designates a bracket which may be of any shape and size for its intended purpose and which may be secured to any part of the automobile 4 by any suitable means. In the embodiment of my invention herein shown, the bracket 2 is provided with openings 5 to receive screws or bolts used in securing it to the automobile. The bracket 2 is provided with a stem 6 which may project therefrom at any desired angle so that the stem may occupy any desired angle with relation to any part of the automobile.

The stem 6 carries two clamp members 7 which, as herein shown, are alike or substantially alike, so that one may be substituted for the other, and, therefore, a description of one will suffice for both, as follows: The member 7 is formed of spring, sheet metal and comprises a central body portion 8 and spaced arms 9 (in the present instance, four in number) extending radially from the body portion 8 and having inturned ends 10. When herein I speak of inturned ends, I mean that the ends 10 of one member 7 shall be turned or project toward the other member 7. The body portion 8 has a central opening 11 therein to receive the stem 6. It will be readily understood that either member 7 may be readily substituted for the other by removing it from the stem 6, reversing its faces and reapplying it to the stem. The two clamp members 7 are placed upon the stem 6 between two collars 12 and 13 thereon. The collar 12 next to the body of the bracket 2 is formed on or secured to the stem 6, and the outer collar 13 is internally threaded and screwed on to the threaded outer end of the stem 6, as a suitable means whereby the collar 13 may be adjusted toward the collar 12. To project the screw threads on the stem 6 from the clamp member 7 adjacent to the collar 13, I provide the inner side of the collar 13 with an extension 14 of smaller diameter than the collar 13. The extension 14 surrounds the stem 6 and is surrounded by the adjacent member 7. The diameter of the stem 6 adjacent the fixed collar 12 is, of course, equal to the diameter of the extension 14, so that the clamp members 7 may be interchangeable as hereinbefore described.

The operation is as follows: When two tire shoes 15 are applied to the carrier, as shown, the collar 13 and outer clamp member 7 are removed from the stem 6 and the two shoes 15 are placed side by side around the stem 6 with their adjacent faces against each other and with the inner face of the inner shoe against the arms 9 of the inner clamp member 7 and with the inturned ends 10 of the inner member 7 embracing and engaging the inner shoe 15. The outer clamp member 7 and collar 13 are then placed upon the stem 6 with the arms 9 of the outer member 7 engaging the outer face of the outer shoe 15 and the inturned ends 10 of the outer member 7 embracing and engaging the outer shoe 15. This being done, the collar 13 is screwed toward the collar 12, thereby forcing the members 7 toward each other and firmly clamping the shoes 15 together and between the two clamp members. To remove the shoes from the carrier, the operation just described is reversed.

The clamp members 7 are formed of spring metal, as previously stated; and, in the normal condition thereof, as shown in Fig. 5, before being clamped between the collars 12 and 13, the body portion 8 and radial arms 9 of each member 7 are straight and extend at right angles to the stem 6. Therefore, when the collar 13 is tightened, the central portions 8 and arms 9 of the members 7 are sprung or bowed toward each other from their straight condition and caused to assume the bowed condition shown in Fig. 3 and thereby, in tending to resume the condition from which they were sprung, the members 7 firmly and yieldingly clamp the shoes therebetween. The inward springing of the central portions of the members 7 has an additional advantage in that it draws the inturned ends 10 toward each other and thereby causes them to clamp the shoes 15 on lines at right angles to the stem 6.

When a single shoe 15 is clamped within the carrier, the two clamp members 7 may be adjusted so that the arms 9 of one member 7 will occupy positions between the arms 9 of the other member, as shown in Fig. 4, and thus prevent the inturned ends 10 of one member from interfering with the inturned ends of the other.

I claim:

1. A carrier for pneumatic tire shoes, comprising a bracket adapted to be secured to an automobile and having a stem, a clamp member on the bracket for engaging one side of a tire shoe, a second clamp member having an opening therein and radially-extending arms, said stem extending through said opening and said arms being adapted to engage one side of a tire shoe, and means for adjusting one member toward the other member.

2. A carrier for pneumatic tire shoes, comprising a bracket adapted to be secured to an automobile and having a stem, a clamp member on the bracket for engaging one side of a tire shoe, a clamp member having a central opening therein and radially-extending arms having inturned outer ends adapted to embrace a tire shoe, said stem extending through said opening and said arms being adapted to engage one side of a tire shoe, and means for adjusting one member toward the other member.

3. A carrier for pneumatic tire shoes, comprising a bracket adapted to be secured to an automobile and having a stem, and a pair of clamping members adapted to receive a tire shoe therebetween, said members each having a central opening therein and radially-extending arms, said stem extending through the openings in said members, the arms of said members being adapted to receive a tire shoe therebetween, and said stem having a fixed collar and an adjustable collar thereon between which said members are located.

4. A carrier for pneumatic tire shoes, comprising a bracket adapted to be secured to an automobile and having a stem, a pair of clamping members adapted to receive a tire shoe therebetween, each member having a central opening therein through which said stem extends, each member having radially-extending arms provided with inturned outer ends adapted to embrace a tire shoe, and means for adjusting one member toward the other member.

5. A carrier for pneumatic tire shoes, comprising a bracket adapted to be secured to an automobile, a clamp member on the bracket for engaging one side of a tire shoe, a second clamp member on the bracket for engaging one side of a tire shoe, and means for adjusting one member toward the other member, one of said members being formed of spring metal and being adapted to be sprung from a normal condition and to clamp a tire shoe in tending to resume the condition from which it was sprung.

6. A carrier for pneumatic tire shoes, comprising a bracket adapted to be secured to an automobile and having a stem, a clamp member on the bracket for engaging one side of a tire shoe, a second clamp member having an opening therein and radially-extending arms, said stem extending through said opening and said arms being adapted to engage one side of a tire shoe, and means for adjusting one member toward the other member, said second clamp member being formed of spring metal and being adapted to be sprung from a normal condition and to clamp a tire shoe in tending to resume the condition from which it was sprung.

7. A carrier for pneumatic tire shoes, comprising a bracket adapted to be secured to an automobile, a pair of clamping members adapted to receive a tire shoe therebetween, said members each having a central opening therein through which said stem extends, and means for adjusting one member toward the other member, each member of said pair being formed of spring metal and being adapted to be sprung from a normal condition and to clamp a tire shoe in tending to resume the condition from which it was sprung.

8. A carrier for pneumatic tire shoes, comprising a bracket adapted to be secured to an automobile and having a stem, a clamp member on the bracket for engaging one side of a tire shoe, a second clamp member having an opening therein through which said stem extends, said second clamp member being adapted to engage one side of a tire shoe, and an adjustable collar on said stem engaging said second clamp member, said collar having an extension thereon within the opening in said second clamp member.

9. A carrier for pneumatic tire shoes, comprising a bracket adapted to be secured to an automobile and having a stem, and a pair of clamping members adapted to receive a tire shoe therebetween, said members each having a central opening therein through which said stem extends, said stem having a fixed collar and an adjustable collar thereon between which said members are located, said adjustable collar having an extension thereon within the opening of the adjacent clamp member, and said stem having a part adjacent said fixed collar of substantially the same diameter as the exterior diameter of said extension and located within the opening of the adjacent clamp member.

In testimony whereof I affix my signature in presence of two witnesses.

DAVID L. VAUGHAN.

Witnesses:
WM. HARRISON SMITH,
A. V. GROUPE.